US012617559B2

(12) United States Patent　　(10) Patent No.:　US 12,617,559 B2
Ochiai et al.　　　　　　　　　　(45) Date of Patent:　　　May 5, 2026

(54) MOVEMENT PREDICTION APPARATUS

(71) Applicant: MITSUBISHI HEAVY INDUSTRIES, LTD., Tokyo (JP)

(72) Inventors: Atsushi Ochiai, Tokyo (JP); Yoshinori Kamiya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 718 days.

(21) Appl. No.: 18/021,663

(22) PCT Filed: Dec. 1, 2021

(86) PCT No.: PCT/JP2021/044070
§ 371 (c)(1),
(2) Date: Feb. 16, 2023

(87) PCT Pub. No.: WO2022/163116
PCT Pub. Date: Aug. 4, 2022

(65) Prior Publication Data
US 2023/0314613 A1　　Oct. 5, 2023

(30) Foreign Application Priority Data

Jan. 29, 2021　(JP) ................................. 2021-012619

(51) Int. Cl.
B64U 10/13　　　(2023.01)
B64U 30/20　　　(2023.01)
(Continued)

(52) U.S. Cl.
CPC ................ B64U 10/13 (2023.01); G01P 3/36 (2013.01); G01S 17/42 (2013.01); G01S 17/66 (2013.01); B64U 10/14 (2023.01); B64U 30/20 (2023.01)

(58) Field of Classification Search
CPC .......... B64U 10/13; B64U 30/20; G01S 17/42
(Continued)

(56) References Cited

U.S. PATENT DOCUMENTS 9,739,870 B1 *　8/2017　Beckman ............... B64D 47/00
2011/0285980 A1　11/2011　Newbury et al.

FOREIGN PATENT DOCUMENTS

JP　　2009-171369　　7/2009
JP　　2013-178169　　9/2013
(Continued)

OTHER PUBLICATIONS

International Search Report issued Feb. 8, 2022 in International Application No. PCT/JP2021/044070.
(Continued)

*Primary Examiner* — Jeffery A Williams
(74) *Attorney, Agent, or Firm* — Wenderoth, Lind & Ponack, L.L.P.

(57) ABSTRACT

A movement prediction apparatus including first and second light output devices, a light reception device, and a processor. The first light output device outputs output-light having a spectral component of a first optical frequency comb of which a frequency comb interval is a first interval. The second light output device outputs reference light having a spectral component of a second optical frequency comb of which a frequency comb interval is a second interval. The light reception device receives combination light that is a combination of the output-light, reflection light that is the output-light reflected by a flying object rotor wing, and the reference light, and measures a distance to the rotor wing based on the combination light. The processor calculates a rotation amount that represents a rotational speed of the rotor wing based on a change amount of the measured distance, and predicts a movement of the flying object.

10 Claims, 12 Drawing Sheets

(51) Int. Cl.

| | |
|---|---|
| *G01P 3/36* | (2006.01) |
| *G01S 17/42* | (2006.01) |
| *G01S 17/66* | (2006.01) |
| *B64U 10/14* | (2023.01) |

(58) Field of Classification Search

USPC ....................................................... 356/4.01

See application file for complete search history.

(56) References Cited

FOREIGN PATENT DOCUMENTS

| | | |
|---|---|---|
| JP | 2018-169265 | 11/2018 |
| JP | 2018-179634 | 11/2018 |
| JP | 2019-184391 | 10/2019 |
| KR | 10-20155284 | 9/2020 |

OTHER PUBLICATIONS

Zhu et al., "Dual-Comb Ranging", Engineering, 2018, vol. 4, pp. 772-778.

\* cited by examiner

F I G.  1

F I G. 3

F I G . 7 A
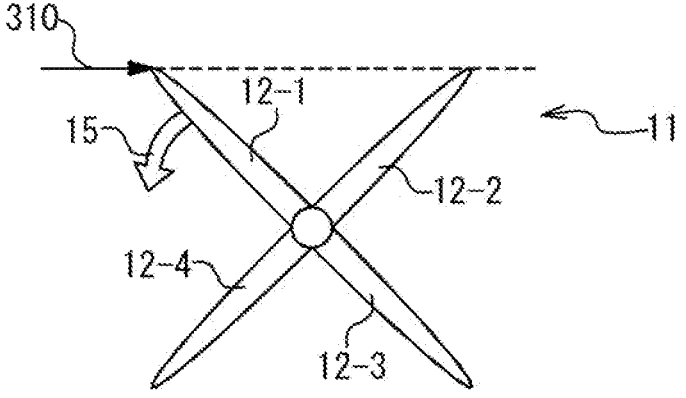
F I G . 7 B
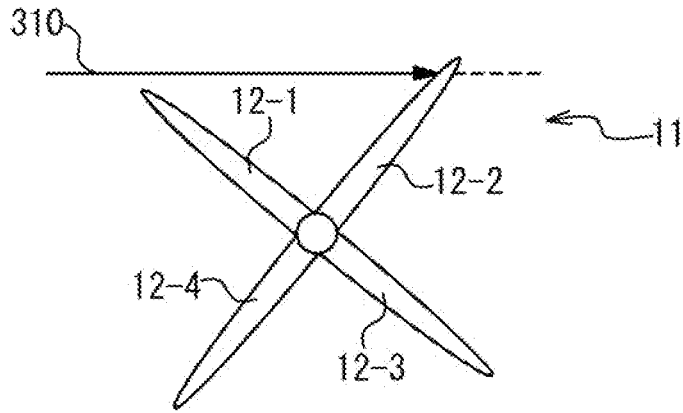

F I G . 7 C
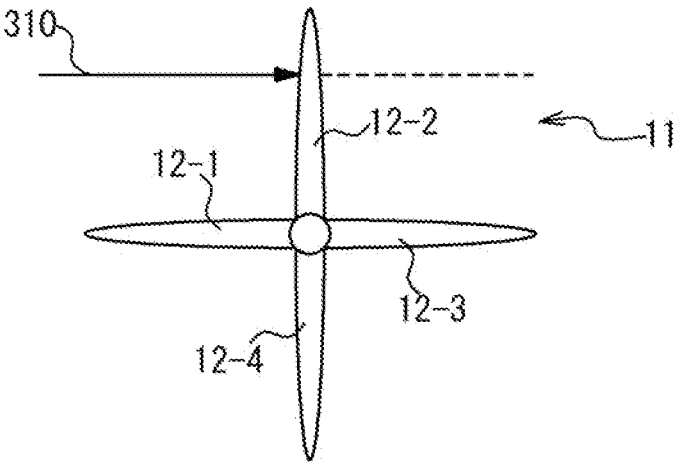
F I G . 7 D
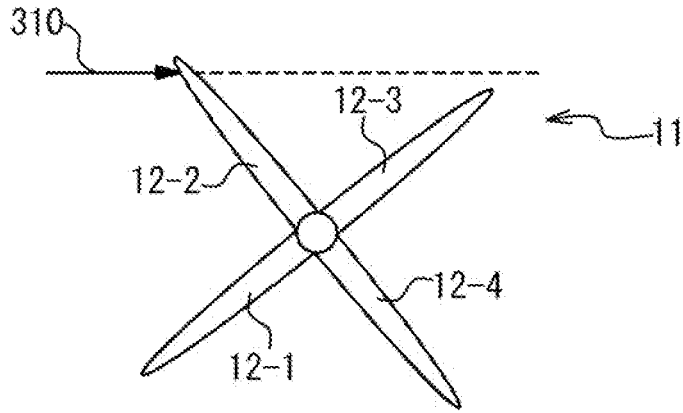

MOVEMENT PREDICTION APPARATUS

TECHNICAL FIELD

The present invention relates to a movement prediction apparatus.

BACKGROUND

In recent years, research has been conducted on techniques of predicting a movement of a mobile object, especially a flying object such as a small unmanned aerial vehicle (UAV).

Patent Literature 1 discloses an image data processor that periodically captures images of a mobile object and predicts a movement of the mobile object based on the captured images.

In addition, as a method of remotely measuring a position of a mobile object, Patent Literature 2 and Non-Patent Literature 1 disclose methods of using two optical frequency combs.

CITED REFERENCE

Patent Literature

[Patent Literature 1] Japanese Patent Publication No. 2009-171369
[Patent Literature 2] US Patent Publication No. 2011/ 0285980

Non-Patent Literature

[Non-Patent Literature 1] Zebin Zhu et al., "Dual-Comb Ranging", (on line), October 2018, Elsevier, [Searched on Oct. 21, 2020], Internet (URL: https://www.sciencedirect.com/science/article/pii/S2095809918303783)

SUMMARY

In connection with the above situation, an objective is to provide a movement prediction apparatus that can predict a movement of a flying object with high accuracy. Other objectives will be understood from following disclosures and descriptions of the embodiments.

A movement prediction apparatus according to an embodiment in order to achieve the above objective is provided with a first light output device, a second light output device, a light reception device, and a processor. The first light output device outputs output-light having a spectral component of a first optical frequency comb of which a frequency comb interval is a first interval. The second light output device outputs reference light having a spectral component of a second optical frequency comb of which a frequency comb is a second interval different from the first interval. The light reception device receives first combination light that is a combination of the output-light, reflection light that is the output-light reflected by a first rotor wing of a flying object having a plurality of rotor wings, and reference light, to measure a first distance to the first rotor wing based on the first combination light. The processor calculates a first rotation amount that represents a rotational speed of the first rotor wing based on a change amount of the measured first distance, and predicts a movement of the flying object based on a change of the calculated first rotation amount.

According to the above embodiment, the movement prediction apparatus can predict a movement of a flying object with high accuracy.

BRIEF DESCRIPTION OF THE DRAWINGS

FIG. 1 is a configuration diagram of a movement prediction apparatus according to an embodiment.

FIG. 3 is a diagram for describing combination light that a light reception device receives in an embodiment.

FIG. 7A is a diagram for describing a relationship between a measured distance from a measurement device to a rotor wing and a rotation amount of the rotor wing in an embodiment.

FIG. 7B is a diagram for describing a relationship between a measured distance from a measurement device to a rotor wing and a rotation amount of the rotor wing in an embodiment.

FIG. 7C is a diagram for describing a relationship between a measured distance from a measurement device to a rotor wing and a rotation amount of the rotor wing in an embodiment.

FIG. 7D is a diagram for describing a relationship between a measured distance from a measurement device to a rotor wing and a rotation amount of the rotor wing in an embodiment.

FIG. 8 is a diagram for describing a relationship between a measured distance from a measurement device to a rotor wing and a rotation amount of the rotor wing in an embodiment.

FIG. 9 is a configuration diagram of a movement prediction apparatus according to an embodiment.

FIG. 10 is a configuration diagram of a movement prediction apparatus according to an embodiment.

DETAILED DESCRIPTION

Embodiment 1

Figure 1:
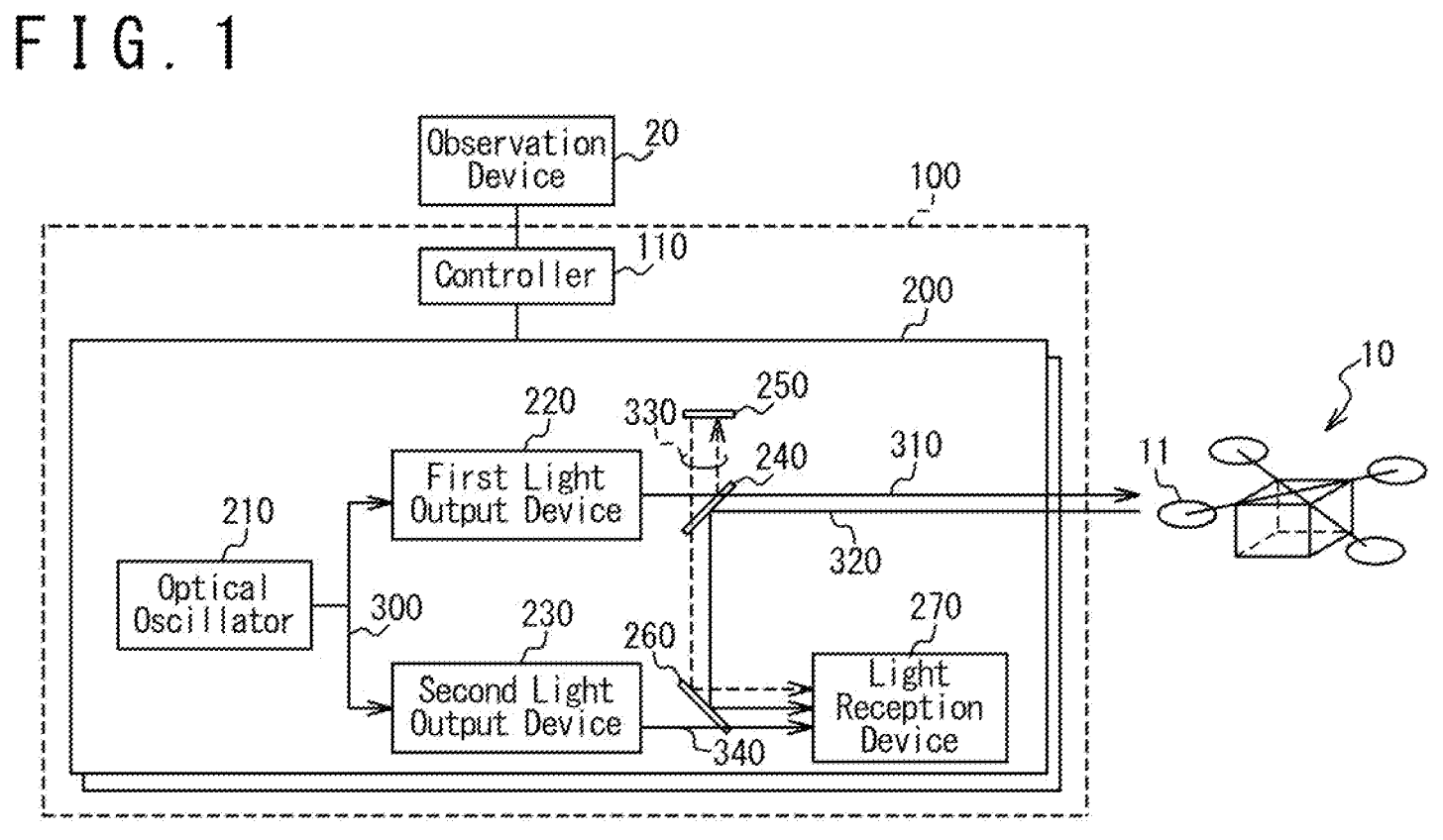
Figure 2A:
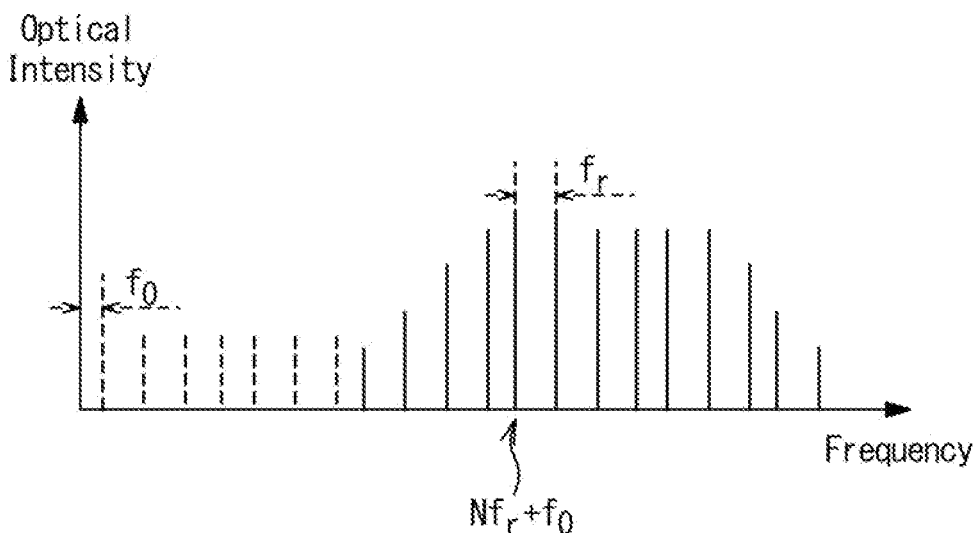
FIG. 2A is a diagram for describing output-light that a first light output device outputs in an embodiment.

As shown in FIG. 1, a movement prediction apparatus 100 according to an embodiment outputs output-light 310 to a flying object 10 and receives reflection light 320 thereof to predict a movement of the flying object 10 such as an ascent, a descent, a turning, an acceleration, a deceleration, a change of attitude, or the like. The flying object 10 has a plurality of rotor wings 11 and controls the movement by changing a number of revolutions per unit of time of the rotor wings, for example. The flying object 10 is a small unmanned aerial vehicle (UAV), a multi-copter, or the like. The movement prediction apparatus 100 measures a distance to a wing provided to the rotor wings 11 of the flying object 10 to acquire a change amount of the distance. The distance from the movement prediction apparatus 100 to the wing periodically changes in accordance to a rotational speed of the rotor wings 11. The movement prediction apparatus 100 calculates a rotation amount that represents the rotational speed of the rotor wings 11 based on this change amount of the distance and calculates a change of the rotational speed of the rotor wings 11. As the flying object 10 moves by changing the rotational speed of the rotor wings 11, the movement prediction apparatus 100 predicts the movement of the flying object 10 based on the change of the rotational speed of the rotor wings 11.

(Configuration of the Movement Prediction Apparatus)

The movement prediction apparatus 100 is communicably connected with an observation device 20. The observation device 20 detects a surrounding flying object 10 and transmits information of the detected flying object 10 such as positional information to the movement prediction apparatus 100. The observation device 20 includes for example a radar device, an imaging device, or the like.

The movement prediction apparatus 100 outputs the output-light 310 to the flying object 10 based on the information of the flying object 10 detected by the observation device 20. The movement prediction apparatus 100 is provided with a controller 110 and one or more ranging devices 200. A ranging device 200 outputs output-light 310 and receives reflection light 320 from a rotor wing 11 of a flying object 10 to measure a distance from the movement prediction apparatus 100 to the rotor wing 11. The controller 110 predicts a movement of the flying object 10 based on the distance from the movement prediction apparatus 100 to the rotor wing 11. In addition, the controller 110 controls the ranging devices 200 based on the predicted movement of the flying object 10.

The ranging device 200 is provided with an optical oscillator 210, a first light output device 220, a second light output device 230, a light reception device 270, and a plurality of optical devices such as a first beam splitter 240, a mirror 250, and a second beam splitter 260. The optical oscillator 210 is configured to output seed light 300 and irradiate the first light output device 220 and the second light output device 230 with the seed light 300.

Figure 2B:
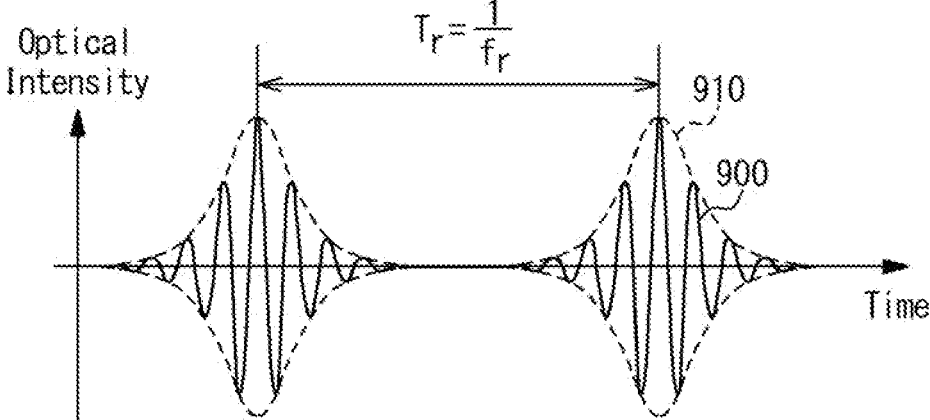
FIG. 2B is a diagram for describing output-light that a first light output device outputs in an embodiment.

The first light output device 220 is configured to receive the seed light 300 and output the output-light 310. As shown in FIG. 2A, the output-light 310 has a plurality of frequencies that are lined up by a predetermined frequency interval $f_r$ (this frequency interval will be referred to as comb frequency interval hereinafter) in a frequency domain and referred to as optical comb or optical frequency comb, and has a spectral component with a comb-like shape. A frequency f that the output-light 310 has may be represented by $f=Nf_r+f_0$. In addition, optical intensity of the output-light 310 having a spectral component as shown in FIG. 2A continuously changes over time as a curved line 900 shown in FIG. 2B. Curved lines 910 that connect positions showing local maxima or position showing local minima of the optical intensity that changes over time are similar to pulse waves with a period $T_r$. The period $T_r$ is calculated by an equation $T_r=1/f_r$ using the comb interval $f_r$.

The second light output device 230 is configured to receive the seed light 300 and output reference light 340. The reference light 340 has a comb-like shaped spectral component that is referred to as optical comb, similarly to the output-light 310. Herein, the comb interval $f_r$ of the reference light 340 is different from the comb interval $f_r$ of the output-light 310. For this reason, the period $T_r$ of the reference light 340 is also different from the period $T_r$ of the output-light 310. For example, the comb interval $f_r$ of the reference light 340 is set to approximate the comb interval $f_r$ of the output-light 310 and so that an optical beat is generated by combining the reference light 340 and the output-light 310.

The first beam splitter 240 is configured to split the output-light 310 into two of which one is transmitted and another one is reflected. The output-light 310 that has been transmitted through the first beam splitter 240 irradiates the flying object 10. The output-light 310 radiated to the flying object 10 is reflected by the flying object 10 as the reflection light 320. The reflection light 320 reflected by the flying object 10 incidents into the first beam splitter 240. The first beam splitter 240 is configured to reflect the incident reflection light 320 toward the second beam splitter 260. The second beam splitter 260 is configured to reflect the reflection light 320 reflected by the first beam splitter 240 toward the light reception device 270.

In addition, the first beam splitter 240 is configured to reflect a part of the output-light 310 toward the mirror 250 as standard light 330. The standard light 330 reflected by the first beam splitter 240 is reflected toward the mirror 250 and incidents the second beam splitter 260. The second beam splitter 260 reflects the incident standard light 330 toward the light reception device 270.

The second beam splitter 260 transmits the reference light 340. The transmitted reference light 340 incidents the light reception device 270.

As described above, the first beam splitter 240 and the second beam splitter 260 are configured to irradiate the flying object 10 with the output-light 310 that the first light output device 220 outputs and irradiate the light reception device 270 with the reflection light 320 that the flying object 10 reflects. In addition, the first beam splitter 240, the mirror 250, and the second beam splitter 260 are configured to irradiate the light reception device 270 with the output-light 310 as the standard light 330 that the first light output device 220 outputs. Furthermore, the second beam splitter 260 is configured to irradiate the light reception device 270 with the reference light 340 that the second light output device 230 outputs.

The light reception device 270 receives the combination light that is the combination of the reflection light 320 from the flying object 10, the standard light 330 outputted from the first light output device 220, and the reference light 340 outputted from the second light output device 230. The light reception device 270 measures the distance from the ranging device 200 to the flying object 10 based on the received combination light.

Figure 3:
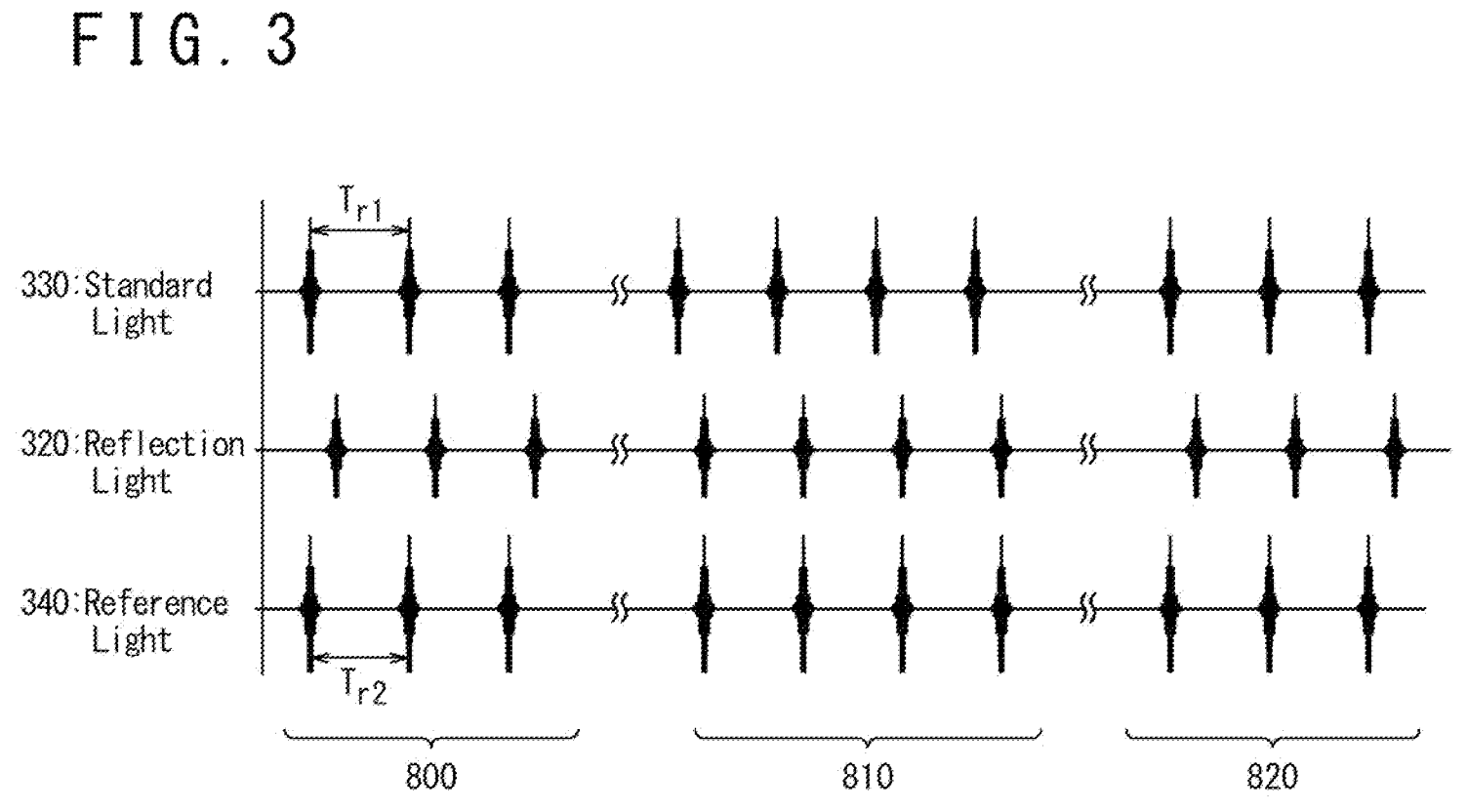

More specifically, the light reception device 270 measures the distance to the rotor wing 11 of the flying object 10. Herein, with reference to the change of the optical intensity over time, the standard light 330 is similar to the pulse light with a period $T_{r1}$, and the reference light 340 is similar to the pulse light with a period $T_{r2}$, as shown in FIG. 3. In addition, the period $T_{r2}$ of the reference light 340 approximates the period $T_{r1}$ of the standard light 330 so that an optical beat is generated when the reference light 340 and the standard light 330 are combined.

For this reason, the optical intensity of the combination light in which the reflection light 320, the standard light 330, and the reference light 340 are combined repeats a relatively high state and a relatively low state. For example, in the first state 800 in FIG. 3, the optical intensity of the combination light in which the reference light 340 and the standard light 330 are combined becomes relatively high. However, as the period $T_{r2}$ of the reference light 340 is different from the period $T_{r1}$ of the standard light 330, the more time passes, the waveform of the reference light 340 shifts from the waveform of the standard light 330, and the optical intensity of the combination light becomes relatively low. As more time passes, in the second state 810, the waveform of the reference light 340 and the waveform of the reflection light 320 overlap and the optical intensity of the combination light becomes relatively high. As more time passes, the waveform of the reference light 340 shifts from the waveform of the reflection light 320 and the optical intensity of the combination light becomes relatively low. As more time passes, the waveform of the reference light 340 and the waveform of the standard light 330 overlap as in the third state 820 and the optical intensity of the combination light becomes relatively high.

The light reception device 270 measures the distance from the ranging device 200 and the flying object 10 based on a time from when the waveform of the reflection light 320 and the waveform of the reference light 340 overlap until when the waveform of the standard light 330 and the waveform of the reference light 340 overlap. For example, the light reception device 270 calculates a time of the first state 800 shown in FIG. 3 from when the optical intensity of the combination light in which the reflection light 320, the standard light 330, and the reference light 340 are combined becomes relatively high to a time of the second state 810 when the optical intensity becomes relatively high subsequently. The light reception device 270 measures the distance based on the calculated time. The calculated time represents a time in which time difference between the reflection light 320 and the standard light 330 is increased. As a result, the light reception device 270 can measure the distance with a higher accuracy than measuring the distance based on a time from when the output-light 310 is outputted until when the reflection light 320 is received.

Figure 4:
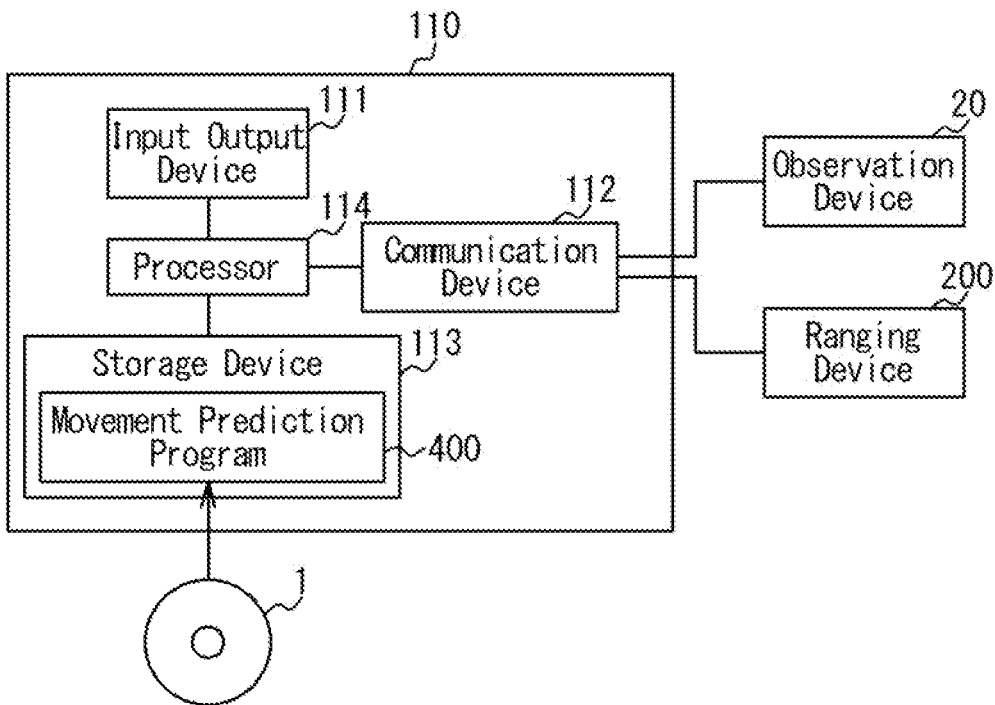
FIG. 4 is a configuration diagram of a controller according to an embodiment.

As shown in FIG. 4, the controller 110 is provided with an input output device 111, a communication device 112, a storage device 113, and a processor 114. For example, the controller 110 is a computer. The input output device 111 receives information for the processor 114 to execute processes. In addition, the input output device 111 outputs result of the processes that the processor 114 executed. The input output device 111 includes various input devices and output devices, and includes for example a keyboard, a mouse, a microphone, a display, a speaker, a touch panel, or the like. The input output device 111 may be omitted.

The communication device 112 performs communication with other devices such as the observation device 20, the ranging devices 200, or the like. The communication device 112 transfers information received from the observation device 20 and the ranging devices 200 to the processor 114. In addition, the communication device 112 transfers control signals that the processor 114 generates to the ranging devices 200. The communication device 112 includes various interfaces such as a network interface card (NIC), universal serial bus (USB), or the like.

The storage device 113 stores various data for predicting the movement of the flying object 10 such as a movement prediction program 400. The storage device 113 is used as a non-transitory tangible storage medium that memorize the movement prediction program 400. The movement prediction program 400 may be provided as a computer program product that is computer-readably stored in a storage medium 1 or may be provided as a computer program product that is downloadable from a server.

The processor 114 performs various data processes for predicting the movement of the flying object 10. The processor 114 reads out from the storage device 113 and executes the movement prediction program 400, and generates control signals for controlling the ranging devices 200. For example, the processor 114 includes a central processing unit (CPU) or the like.

Figure 5:
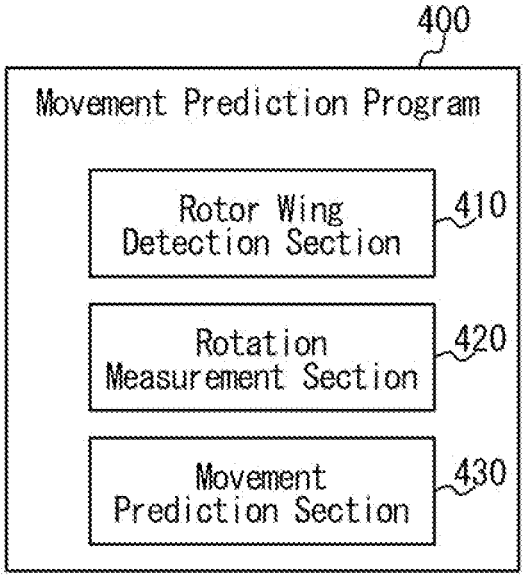
FIG. 5 is a configuration diagram of a movement prediction program according to an embodiment.

As shown in FIG. 5, the processor 114 realizes a rotor wing detection section 410, a rotation measurement section 420, and the movement prediction section 430 by executing the movement prediction program 400. The rotor wing detection section 410 detects a position where a rotor wing 11 of a flying object 10 exists. The rotation measurement section 420 outputs output-light 310 to the detected position of the rotor wing 11 and measures a rotation amount that represents a rotational speed of the rotor wing 11 of the flying object 10. The movement prediction section 430 predicts a movement of the flying object 10 based on the measured rotation amount.

(Operation of the Movement Prediction Apparatus)

Figure 6:
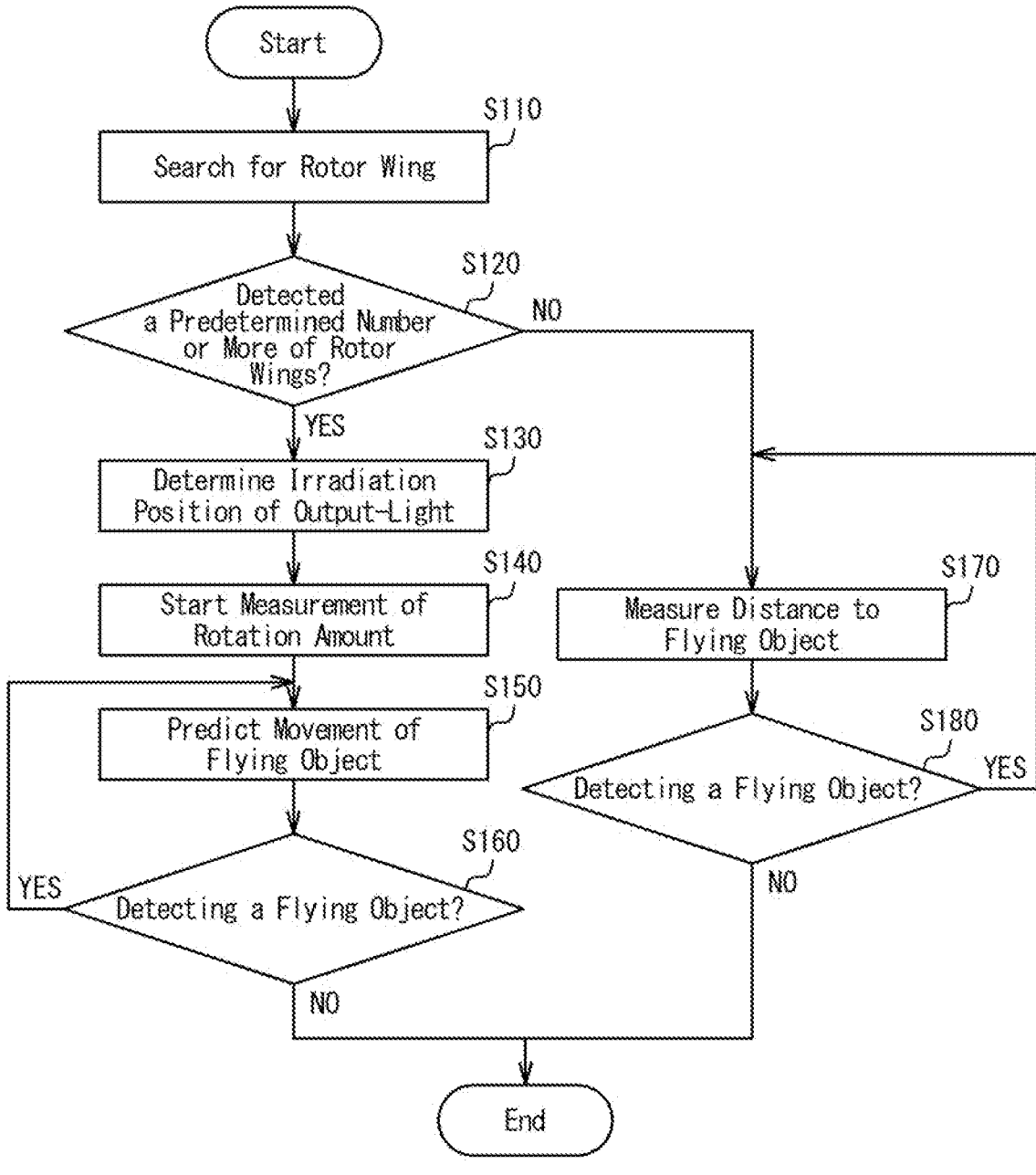
FIG. 6 is a flowchart that shows an operation of a movement prediction apparatus according to an embodiment.

When a flying object 10 approaches the movement prediction apparatus 100, the observation device 20 detects the flying object 10. The observation device 20 transmits position information of the detected flying object 10 to the processor 114 of the movement prediction apparatus 100. When the processor 114 receives the position information of the flying object 10, the processor 114 executes a process of the movement prediction method shown in FIG. 6 by executing the movement prediction program 400.

In the step S110, the rotor wing detection section 410 that is realized by the processor 114 searches for a position of a rotor wing 11 of a flying object 10. Specifically, the rotor wing detection section 410 transmits a control signal for outputting seed light 300 to the optical oscillator 210. The optical oscillator 210 outputs seed light 300 based on the control signal from the rotor wing detection section 410. In addition, the rotor wing detection section 410 generates a first light output signal for outputting output-light 310 and a second light output signal for outputting reference light 340. The first light output device 220 outputs output-light 310 based on the first light output signal. In addition, the second light output device 230 outputs reference light 340 based on the second light output signal.

The rotor wing detection section 410 outputs output-light 310 based on the position information of the flying object 10 in order to search for the position where the flying object 10 exists, and searches for the position of the rotor wing 11 of the flying object 10. Specifically, the rotor wing detection section 410 uses a ranging device 200 and measures a distance to a predetermined position of an object in a direction in which the output-light 310 is outputted, such as the flying object 10. The rotor wing detection section 410 detects a position of which the distance that the light reception device 270 measures changes rapidly, continuously, and periodically, as the position of the rotor wing 11.

Figure 7E:
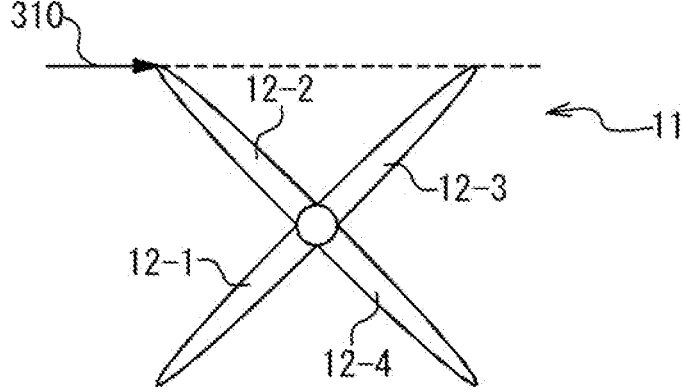
FIG. 7E is a diagram for describing a relationship between a measured distance from a measurement device to a rotor wing and a rotation amount of the rotor wing in an embodiment.

A distance from a ranging device 200 to a rotor wing 11 of a flying object 10 changes rapidly, continuously, and periodically over time. For example, as shown in FIG. 7A, a ranging device 200 measures a distance to a first wing 12-1 of a rotor wing 11 irradiated with output-light 310. The rotor wing 11 rotates for example in a counterclockwise direction shown in the arrow 15. As shown in FIG. 7B, when the rotor wing 11 rotates, the first wing 12-1 moves out from the radiation line of output-light 310 and the output-light 310 irradiates a second wing 12-2. For this reason, in a state of FIG. 7B, the distance that the ranging device 200 measures becomes longer than that in the state of FIG. 7A. As shown in FIG. 7C, when the rotor wing 11 rotates furthermore, the second wing 12-2 approaches the ranging device 200. As a result, the distance that the ranging device 200 measures becomes shorter. As shown in FIG. 7D, when the rotor wing
11 rotates furthermore, the second wing 12-2 approaches the
ranging device 200 and the distance that the ranging device
200 measures becomes shorter. As shown in FIG. 7E, when
the rotor wing 11 rotates to a predetermined position, the
output-light 310 irradiates the tip of the second wing 12-2.
When the rotor wing 11 rotates furthermore, the second wing
12-2 move out from the irradiation line of the output-light
310. For this reason, the output-light 310 irradiates a third
wing 12-3. As described above, when the output-light 310
irradiates the rotor wing 11, the distance that the ranging
device 200 measures periodically changes.

In the step S120, the rotor wing detection section 410
determines whether a predetermined number or more of
rotor wings 11 has been detected. For example, the rotor
wing detection section 410 determines whether three or
more rotor wings 11 has been detected. When the rotor wing
detection section 410 detected a predetermined number, for
example three or more, of rotor wings 11, the process of the
step S130 is executed to predict a movement of the flying
object 10. When the rotor wing detection section 410 does
not detect a predetermined number or more of rotor wings
11, the process of the step S170 is executed, by determining
that the flying object 10 is not controlling a fine movement
such as an ascent, a descent, or a turning by the rotor wing
11.

In the step S130, the rotation measurement section 420
determines an irradiation position to irradiate with the
output-light 310. Specifically, the rotation measurement
section 420 determines a predetermined position in each
region of regions of the plurality of detected rotor wings 11
as an irradiation position. For example, in the region of the
detected rotor wing 11, a position at a predetermined dis-
tance from the center thereof is determined as the irradiation
position. The predetermined distance may be determined
based on a width size that is the longest length in the region
of the rotor wing 11, for example. The predetermined
distance may be 30% of the width size that is the longest
length in the region of the rotor wing 11, for example. It
should be noted that the width size of the region of the rotor
wing 11 represents a length of a line segment connecting two
edges of the region, for example.

Figure 8:
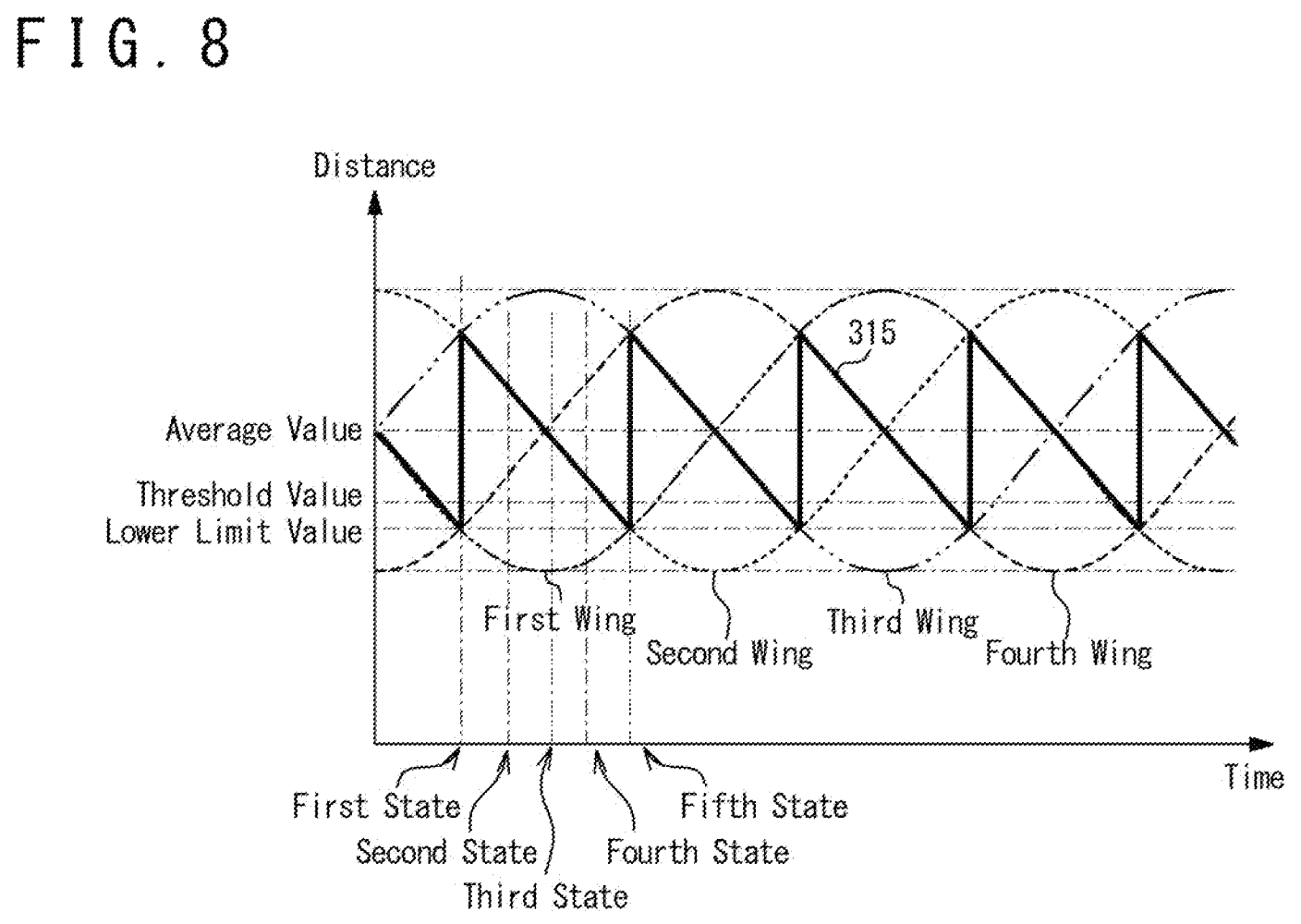

In the step S140, the rotation measurement section 420
starts a measurement of a rotation amount that represents a
rotational speed of each rotor wing 11 based on a change
amount of the distance that is measured by irradiating each
determined irradiation position with the output-light 310. In
a region of a rotor wing 11, the distance that the ranging
device 200 measures periodically changes within a prede-
termined range like the curved line 315 in FIG. 8. The first
state shown in FIG. 8 represents the state of FIG. 7A and
represents a state immediately before the first wing 12-1
moves out from the irradiation line of the output-light 310.
When the output-light 310 irradiates the first wing 12-1, the
measured distance shows the lower limit value; and at the
moment when the output-light 310 leaves the first wing
12-1, the measured distance rapidly increases. The second
state shown in FIG. 8 represents the state in FIG. 7B: as the
second wing 12-2 that is irradiated with the output-light 310
approaches the ranging device 200, the measured distance
becomes shorter. The third state shown in FIG. 8 represents
the state in FIG. 7C and the fourth state shown in FIG. 8
represents the state in FIG. 7D. The fifth state shown in FIG.
8 represents the state in FIG. 7E: when the output-light 310
irradiates the second wing 12-2, the measured distance
shows the lower limit. At the moment when the output-light
310 leaves the second wing 12-2, the measured distance rapidly increases. As described above, the wing irradiated
with the output-light 310 changes to the first wing 12-1, the
second wing 12-2, the third wing 12-3, and the fourth wing
12-4 in order. In accordance with this change, the measured
distance periodically changes.

The rotation measurement section 420 measures a rotation
amount based on changes of the measured distance. For
example, when the rotor wing 11 has four wings, as each of
the first wing 12-1 to the fourth wing 12-4 are irradiated with
the output-light 310 during one rotation of the rotor wing 11,
the measured distance periodically changes four times.
When the rotational speed of the rotor wing 11 increases, the
time during which the change of the measured distance is
repeated four times becomes shorter. As described above,
the rotation measurement section 420 measures the rotation
amount based on the amount of time required for the change
of the measured distance to be repeated a predetermined
count of times. It should be noted that the count of times,
which the change of the measured distance is repeated, does
not depend on the number of wings that the rotor wing 11
has. For example, even if the rotor wing 11 has five wings,
the rotation amount may be measured based on the amount
of time required for the change of the measured distance to
be repeated four times.

For example, the rotation measurement section 420 mea-
sures the rotation amount based on an amount of time
required for a count of times, that the measured distance
becomes smaller than a threshold value, to reach a prede-
termined count of times. This threshold value is determined
based on a difference between the lower limit value and the
average value of the measured distance, as shown in FIG. 8.
For example, the threshold value is a value which the
average value subtracted with 80% of the difference between
the lower limit value and the average value of the measured
distance. The rotation measurement section 420 counts the
times that the measured distance becomes smaller than the
threshold value, and measures the amount of time until the
count of times reaches a predetermined value, which is four,
for example. The rotation measurement section 420 calcu-
lates an inverse number of the measured amount of time as
the rotation amount. It should be noted that the average
value of the measured distance represents the average value
of the distance that is measured during a predetermined
period, and the lower limit value represents the shortest
distance that is measured during a predetermined period.

In addition, the rotation measurement section 420 deter-
mines a rotation direction of the rotor wing 11 based on the
change amount of the measured distance. Specifically, the
rotation measurement section 420 determines the rotation
direction of the rotor wing 11 based on the irradiation
position of the output-light 310 in the region of the rotor
wing 11 and the change amount of the measured distance. As
shown in FIG. 7A, when the irradiation position is in left
side of the region of the rotor wing 11 and the rotor wing 11
is rotating in a counterclockwise direction when viewed
from above, the measured distance repeats a first state of
rapid increase and the second to fourth states of gradual
decrease, as shown in FIG. 8. On the other hand, when the
rotor wing 11 is rotating in a clockwise direction, the
measured distance repeats a state of rapid decrease and
states of gradual increase. In addition, when the irradiation
position is in right side of the region of the rotor wing 11 and
the rotor wing 11 is rotating in a counterclockwise direction
when viewed from above, the measured distance repeats a
state of rapid decrease and states of gradual increase. When
the rotor wing 11 rotates in clockwise direction, the mea-
sured distance repeats a state of rapid increase and states of gradual decrease. As described above, the rotation measurement section 420 determines the rotation direction of the rotor wing 11 by determining whether the irradiation position of the output-light 310 is in left side or right side of the region of the rotor wing 11 and whether an increase or a decrease in the distance that is periodically measured changes relatively rapidly.

In the step S150, the movement prediction section 430 predicts the movement of the flying object 10 based on the measured rotation amount of each rotor wing 11. The movement prediction section 430 determines based on changes of the rotation amount that a force according to the change of the rotation amount is working at the position of the corresponding rotor wing 11. For example, when the rotation amount is increasing, the movement prediction section 430 determines that an upward force is increasing at the position of the corresponding rotor wing 11. In addition, when the rotation amount is decreasing, the movement prediction section 430 determines that a downward force is increasing at the position of the corresponding rotor wing 11.

The movement prediction section 430 determines forces generated at the position where each rotor wing 11 is arranged and predicts the movement of the flying object 10. For example, when a rotation amount of a rotor wing 11 of a plurality of rotor wings 11 that is in relatively right direction is increasing compared to a rotation amount of a rotor wing 11 that is in relatively left direction, the movement prediction section 430 predicts that the flying object 10 will move to left direction. In addition, when the rotation amount of all rotor wings 11 is increasing, the movement prediction section 430 predicts that the flying object 10 will ascend. Furthermore, when the rotational speed of a rotor wing 11 that is rotating in counterclockwise direction when viewed from above is increasing compared to the rotational speed of a rotor wing 11 that is rotating in clockwise direction, the movement prediction section 430 predicts that the flying object 10 will turn in counterclockwise direction. When the rotational speed of a rotor wing 11 that is rotating in clockwise direction when viewed from above is increasing compared to the rotational speed of a rotor wing 11 that is rotating in counterclockwise direction, the movement prediction section 430 predicts that the flying object 10 will turn in clockwise direction.

The movement prediction section 430 may determine an attitude of the flying object 10 based on the position of the rotor wing 11 that the ranging section 200 has measured. The movement prediction section 430 determines a position in a direction in which the output-light 310 is radiated from the ranging device 200 and at the measured distance as the position of each rotor wing 11. The movement prediction section 430 determines an attitude such as an inclination of the flying object 10 based on the position of each rotor wing 11. For example, when the position of a rotor wing 11 among a plurality of rotor wings 11 that is in relatively right direction is lower than the position of a rotor wing 11 that is in relatively left direction, the movement prediction section 430 determines that the flying object 10 is tilted so that right side is lower than left side. The movement prediction section 430 may predict the movement of the flying object 10 based on the determined attitude of the flying object 10 and the rotation amount of each rotor wing 11.

In the step S160, the movement prediction section 430 determines whether the movement prediction section 430 is detecting a flying object 10. When the movement prediction section 430 is detecting a flying object 10, the process of the step S150 will be executed and the process will be repeated. At that time, the rotation measurement section 420 changes the position to irradiate with the output-light 310 in accordance with the movement of the flying object 10 that the movement prediction section 430 has predicted. For example, when it is predicted that the flying object 10 will move to left, the rotation measurement section 420 moves the position to irradiate with the output-light 310 to left. As described above, the rotation measurement section 420 moves the position to irradiate with the output-light 310 depending on the movement of the flying object 10 and carries on measuring the rotation amount of each rotor wing 11.

When the movement prediction section 430 is not detecting any flying object 10, the process of predicting the movement of the flying object 10 that the observation device 20 detected ends. The rotation measurement section 420 stops the output of the output-light 310 when the process ends.

In the step S120, when the rotor wing detection section 410 does not detect a predetermined number or more of rotor wings 11, the processor 114 executes the step S170. In the step S170, the processor 114 carries on measuring the distance from the ranging device 200 to the flying object 10. By measuring the distance to the flying object 10 by use of the ranging device 200, the processor 114 can measure the position of the flying object 10 with high accuracy.

In the step S180, the processor 114 determines whether the processor 114 is detecting a flying object 10. When the processor 114 is detecting a flying object 10, the process of the step S170 will be executed and the process will be repeated. When the processor 114 is not detecting any flying object 10, the process of predicting the movement of the flying object 10 that the observation device 20 detected ends. The processor 114 stops the output of the output-light 310 when the process ends.

As described above, the movement prediction apparatus 100 predicts a movement of a flying object 10 based on forces that the rotor wings 11 of the flying object 10 generate. As a result, the movement prediction apparatus 100 predicts the movement of the flying object 10 with high accuracy.

Embodiment 2

Figure 9:
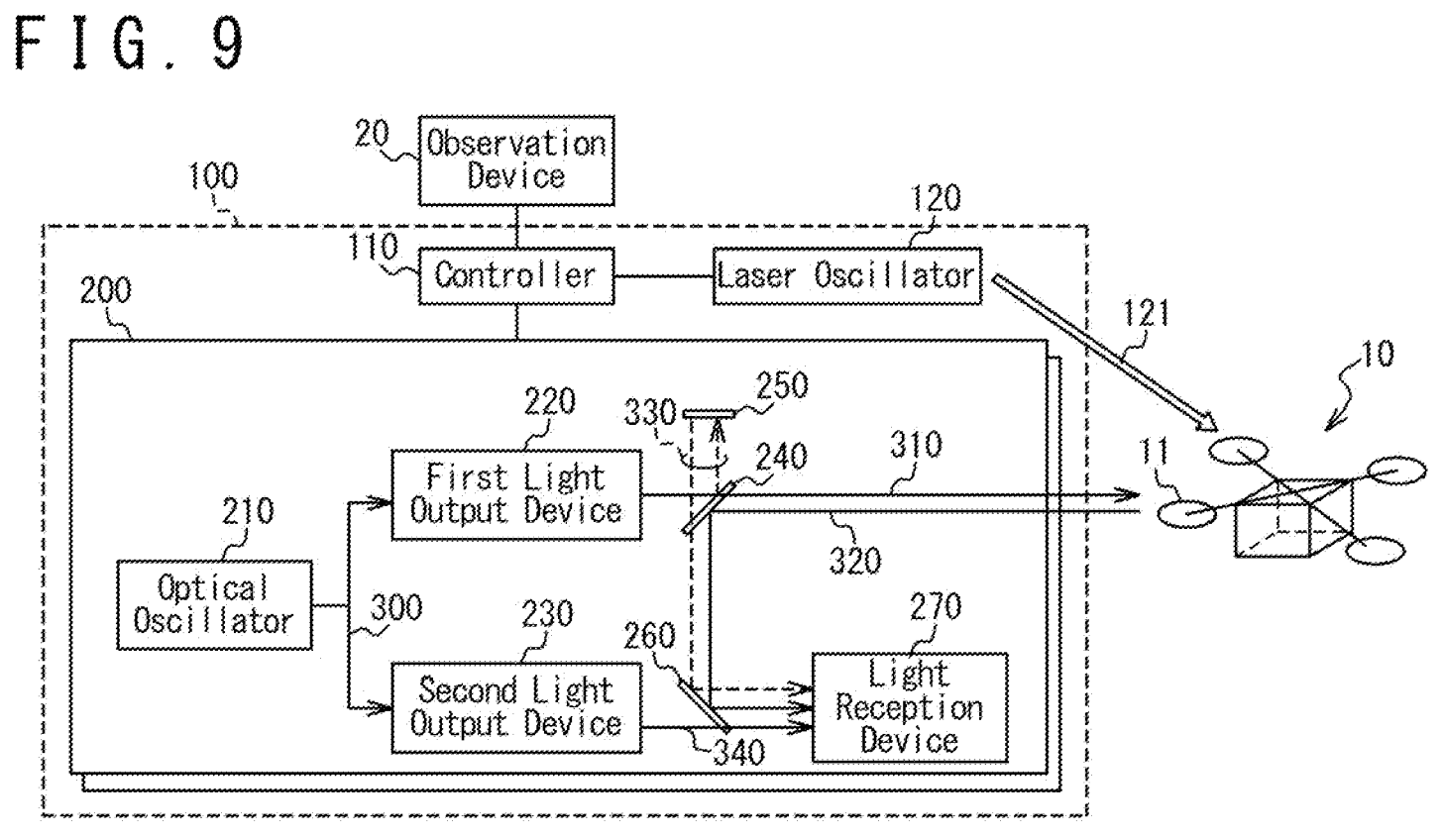

As shown in FIG. 9, the movement prediction apparatus 100 may be provided with a laser oscillator 120 that irradiates a flying object 10 with a high-power laser beam 121. The laser oscillator 120 irradiates a predetermine position of the flying object 10 with the laser beam 121 in accordance with the movement of the flying object 10, that the movement prediction apparatus 100 predicted, to deal with the flying object 10.

The controller 110 controls the laser oscillator 120. For example, the controller 110 generates a signal that indicates an irradiation position of the laser beam 121 that the laser oscillator 120 radiates such as an irradiation direction of the laser beam 121, a focus distance, and the like. The laser oscillator 120 radiates the laser beam 121 based on the generated signal. As other configurations and operations of the movement prediction apparatus 100 is similar to the embodiment 1, description thereof will be omitted.

Embodiment 3

Figure 10:
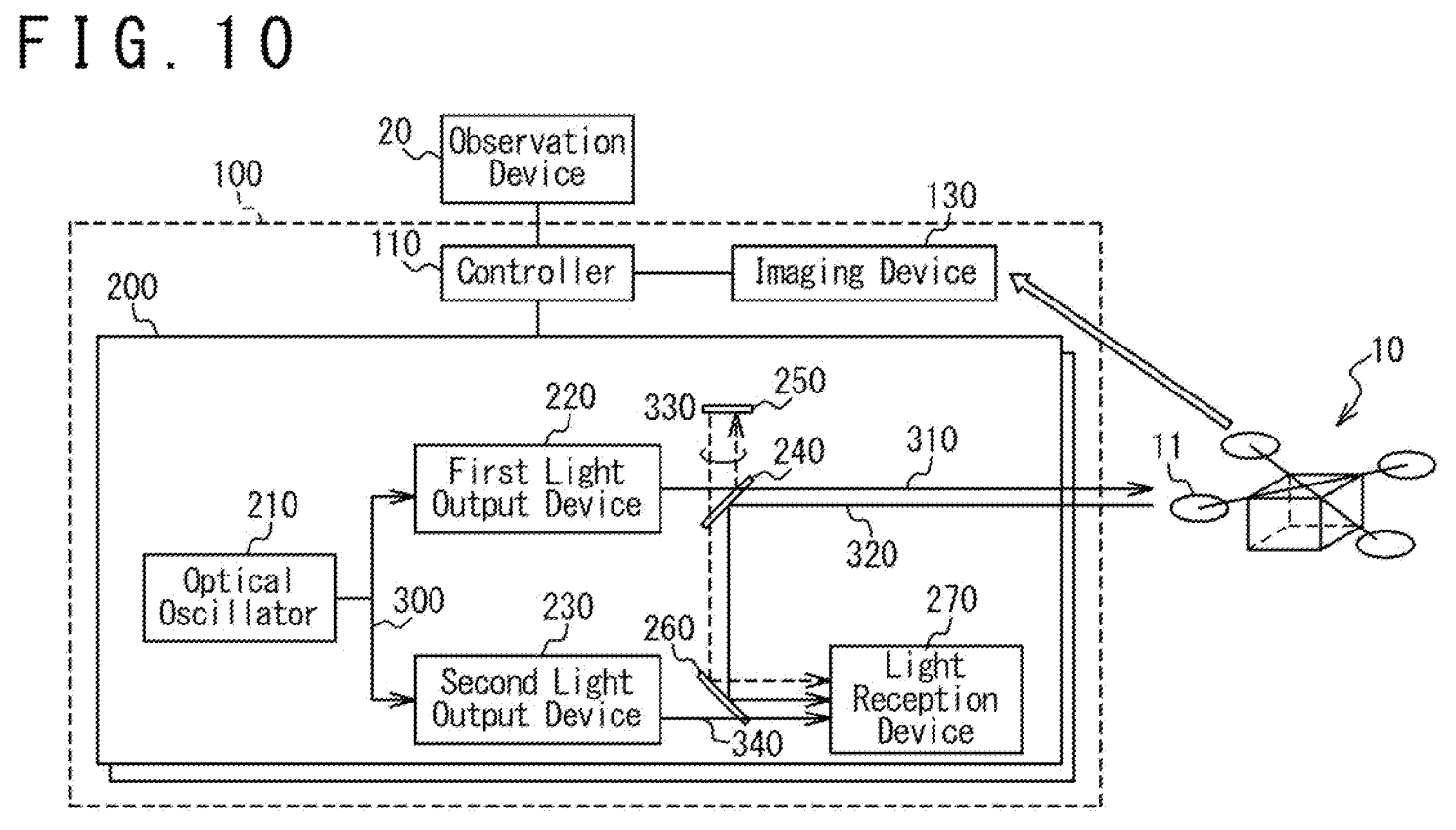

As shown in FIG. 10, the movement prediction apparatus 100 may be provided with an imaging device 130 that captures an image of the flying object 10. The movement prediction section 430 predicts the movement of the flying object 10 based on a rotation amount of the rotor wing 11 that is measured by the ranging device 200. In addition, the movement prediction section 430 judges the movement of the flying object 10 such as a movement route, a change of attitude, and the like based on an image of the flying object 10 that the imaging device 130 captured. The movement prediction section 430 updates a relationship between the change of the rotation amount of each rotor wing 11 and a ratio of change of the predicted movement of the flying object 10 such as a ratio of changes of speed, acceleration, angular acceleration or the like, based on a difference between a movement of the flying object 10 determined from the image and a movement of the flying object 10 predicted from the rotation amount of the rotor wing 11.

Specifically, the movement prediction section 430 acquires images of the flying object 10 that are captured before and after the prediction of the movement of the flying object 10, and calculates a distance that the flying object 10 moved from the acquired images. The movement prediction section 430 updates the relationship between the change of the rotation amount of the rotor wing 11 and the ratio of the change of the predicted movement of the flying object 10, based on a difference between the calculated movement distance of the flying object 10 and the predicted movement distance of the flying object 10.

For example, it is assumed that the flying object 10 moves upward. At that time, the movement prediction section 430 calculates a distance the flying object 10 moved upward from the images captured before and after the prediction of the movement of the flying object 10. The movement prediction section 430 compares the distance of the upward movement of the flying object 10 that is calculated from the captured images and the distance of the upward movement of the flying object 10 predicted from the rotation amount of the rotor wing 11. When the distance calculated from the captured images is smaller than the distance predicted from the rotation amount of the rotor wing 11, the movement prediction section 430 updates so that the distance of the upward movement of the flying object 10 predicted from the rotation amount of the rotor wing 11 becomes smaller.

As a result, the movement prediction section 430 can improve the accuracy of predicting the movement in accordance with the detected flying object 10. As other configurations and operations of the movement prediction apparatus 100 are similar to the embodiment 1, descriptions thereof will be omitted.

VARIATION EXAMPLES

Although in each embodiment, examples that the rotation measurement section 420 measures a rotation amount of each detected rotor wing 11 have been shown, this is not limitative, and the rotation measurement section 420 may measure rotation amounts of two or more rotor wings 11 of the detected rotor wings 11. The movement prediction section 430 predicts the movement of the flying object 10 based on the positions and the rotation amounts of the rotor wings 11 that are measured.

As long as the rotation measurement section 420 can measure the rotation amount of the rotor wing 11 based on the change amount of the distance from the ranging device 200 to the rotor wing 11, an arbitrary method may be selected. For example, the rotation measurement section 420 may calculate the rotation amount based on an amount of time required for reaching a predetermined number of times that a change amount of the distance from an average value of the measured distances exceeds a threshold value. The threshold value may be determined based on a difference between a distance that represents an average value of the measured distances and a distance of the measured distances that is the furthest from the average value. In addition, the rotation measurement section 420 may calculate a period of the measured distance by an arbitrary method and calculate the rotation amount from the calculated period.

The imaging device 130 may capture a video of the flying object 10. In this case, the movement prediction section 430 extracts each frame of the captured video as images and judges the movement of the flying object 10 based on the extracted images.

The embodiments and the variation examples that are described above are examples and may be modified within a range of not inhibiting the functions. In addition, the configurations described in each embodiment and variation example may be arbitrarily modified and/or arbitrarily combined within a range of not inhibiting the functions.

For example, the movement prediction apparatus 100 may be provided with the laser oscillator 120 and the imaging device 130. In addition, if the light reception device 270 can receive the standard light 330, the reflection light 320 and the reference light 340, an arbitrary configuration may be selected as the optical system of the first beam splitter 240, the mirror 250 and the like. In addition, if one light reception device 270 can receive a plurality of combinations of light and measure a distance based on each combination of light, the movement prediction apparatus 100 may have with one light reception device 270 that is common to the plurality of ranging devices 200. The movement prediction apparatus 100 may be provided with one first light output device 220 that is common to the plurality of ranging devices 200, split the output-light 310 that the one first light output device 220 outputs, and irradiate each rotor wing 11 of the flying object 10 with the split output-light 310. One second light output device 230 common to the plurality of ranging devices 200 may be provided.

The movement prediction apparatus according to each embodiment is understood for example as below.

A movement prediction apparatus according to a first aspect is provided with a first light output device (220), a second light output device (230), a light reception device (270), and a processor (114). The first light output device (220) irradiates a first rotor wing (11) of a flying object (10) with output-light (310) having a spectral component of an optical frequency comb. The light reception device (270) measures a first distance to the first rotor wing by use of reflection light (320) from the first rotor wing of the flying object. The processor (114) calculates a first rotation amount that represents a rotational speed of the first rotor wing based on a change amount of the first distance that the light reception device has measured, and predicts a movement of the flying object based on a change of the calculated first rotation amount.

The movement prediction apparatus can predict a movement of a flying object with high accuracy by use of a rotation amount of a rotor wing.

A movement prediction apparatus according to a second aspect is the movement prediction apparatus according to the first aspect, and is configured so that the processor (114) calculates the first rotation amount based on a period of the change amount of the measured first distance.

As a result, the movement prediction apparatus can predict the movement of the flying object by calculating the first rotation amount that corresponds to a number of revolutions per unit of time of the rotor wing, without acquiring an actual number of revolutions per unit of time of the rotor wing.

A movement prediction apparatus according to a third aspect is the movement prediction apparatus according to the first aspect and is configured so that the processor (114) calculates the first rotation amount based on a time required for a count of times that the distance that changes from an average of the measured first distance exceeds a threshold distance to reach a predetermined count of times.

The movement prediction apparatus according to a fourth aspect is the movement prediction apparatus according to the third aspect and is configured so that the threshold value is determined based on a difference between an average value of the first distance and a furthest distance from the average value.

As a result, the movement prediction apparatus can easily calculate a rotation amount of a rotor wing.

A movement prediction apparatus according to a fifth aspect is the movement prediction apparatus according to the first aspect and is configured so that the processor (114) determines a rotation direction of the first rotor wing based on a change amount of the first distance.

A movement prediction apparatus according to a sixth aspect is the movement prediction apparatus according to the first aspect and is configured so that the processor (114) determines a rotation direction of the first rotor wing based on a position of the first rotor wing where the output-light (310) irradiates and the change amount of the first distance.

A movement prediction apparatus according to a seventh aspect is the movement prediction apparatus of the first aspect and is configured so that the processor (114) determines a rotation direction of the first rotor wing based on whether a position where the output-light irradiates is on a left side or a right side of the first rotor wing and whether an increase or a decrease in the first distance that is periodically measured changes relatively rapidly.

As a result, the movement prediction apparatus can determine a rotation direction of a rotor wing.

A movement prediction apparatus according to an eighth aspect is the movement prediction apparatus according to the seventh aspect and is configured so that the processor (114) calculates a rotation direction and a change of rotation amount of a second rotor wing of the flying object and predicts the movement of the flying object.

As a result, the movement prediction apparatus can predict a movement of a flying object with high accuracy by using a rotation direction of a rotor wing.

A movement prediction apparatus according to a ninth aspect is the movement prediction apparatus according to the first aspect and is provided with an imaging device (130) that captures an image of the flying object. Furthermore, the processor (114) judges the movement of the captured flying object and updates a relationship between the change of the rotation amount and a ratio of a change of the movement of the flying object predicted from the rotation amount.

A movement prediction apparatus according to a tenth aspect is the movement prediction apparatus according to the first aspect and is configured to be further provided with a laser oscillator (120).

As a result, the movement prediction apparatus can deal with an approaching flying object.

The present application claims priority based on Japanese Patent Application No. 2021-12619, filed on Jan. 29, 2021, the entire disclosure of which is incorporated herein by reference.

The invention claimed is:

1. A movement prediction apparatus comprising:
a first light output device configured to output output-light having a spectral component of a first optical frequency comb of which a frequency comb interval is a first interval;
a second light output device configured to output reference light having a spectral component of a second optical frequency comb of which a frequency comb interval is a second interval different from the first interval;
a light reception device configured to receive first combination light that is a combination of standard light that is a first part of the output-light, first reflection light that is a second part of the output-light reflected by a first rotor wing of an flying object having a plurality of rotor wing s, and the reference light, to measure a first distance to the first rotor wing based on the first combination light; and
a processor configured to calculate a first rotation amount that represents a rotational speed of the first rotor wing based on a change amount of the measured first distance, and predict a movement of the flying object based on a change of the calculated first rotation amount.

2. The movement prediction apparatus according to claim 1,
wherein the processor is further configured to calculate the first rotation amount based on a period of the change amount of the first distance.

3. The movement prediction apparatus according to claim 1,
wherein the processor is further configured to calculate the first rotation amount based on an amount of time required for reaching a predetermined number of times that the change amount of the measured first distance from an average of the first distance exceeds a threshold value.

4. The movement prediction apparatus according to claim 3,
wherein the threshold value is determined based on a difference between the average of the first distance and a distance of the measured first distance that is the furthest from the average.

5. The movement prediction apparatus according to claim 1,
wherein the processor is further configured to determine a rotation direction of the first rotor wing based on the change amount of the first distance.

6. The movement prediction apparatus according to claim 1,
wherein the processor is further configured to determine a rotation direction of the first rotor wing based on a position of the first rotor wing where the second part of the output-light irradiates and the change amount of the first distance.

7. The movement prediction apparatus according to claim 1,
wherein the processor is further configured to determine a rotation direction of the first rotor wing based on:
whether a position where the second part of the output-light irradiates is on a left side or a right side of the first rotor wing; and
whether an increase or a decrease in the first distance that is periodically measured changes relatively rapidly.

8. The movement prediction apparatus according to claim 7, wherein the light reception device is further configured to receive second combination light that is a combination of the standard light, second reflection light that is the second part of the output-light reflected by a second rotor wing of the flying object, and the reference light, to measure a second distance to the second rotor wing based on the second combination light, and wherein the processor is further configured to:

calculate a second rotation amount that represents a rotational speed of the second rotor wing based on a change amount of the measured second distance;

determine a rotation direction of the second rotor wing based on the change of the second rotation amount; and predict the movement of the flying object based on the rotation direction of the first rotor wing, the change of the first rotation amount, the rotation direction of the second rotor wing, and the change of the second rotation amount.

9. The movement prediction apparatus according to claim 1, further comprising an imaging device configured to capture an image of the flying object, wherein the processor is further configured to:

judge the movement of the flying object based on the captured image of the flying object; and update a relationship between the change of the first rotation amount and a ratio of a change of the predicted movement of the flying object, based on the movement of the flying object determined from the image and the movement of the flying object predicted from the first rotation amount.

10. The movement prediction apparatus according to claim 1, further comprising a laser oscillator configured to radiate a laser beam, wherein the processor is further configured to control an irradiation position of the radiated laser beam based on the predicted movement of the flying object.

\* \* \* \* \*